(12) United States Patent
Louchet et al.

(10) Patent No.: US 9,926,238 B2
(45) Date of Patent: Mar. 27, 2018

(54) ENVIRONMENTAL BARRIER FOR A REFRACTORY SUBSTRATE CONTAINING SILICON

(71) Applicants: HERAKLES, Le Haillan (FR); UNIVERSITE DE BORDEAUX, Bordeaux (FR)

(72) Inventors: Caroline Louchet, Arsac (FR); Emilie Courcot, Le Taillan Medoc (FR); Francis Rebillat, Merignac (FR); Arnaud Delehouze, Sainneville sur Seine (FR)

(73) Assignees: HERAKLES, Le Haillan (FR); UNIVERSITE DE BORDEAUX, Bordeaux (FR)

( * ) Notice: Subject to any disclaimer, the term of this patent is extended or adjusted under 35 U.S.C. 154(b) by 0 days.

(21) Appl. No.: 14/897,471

(22) PCT Filed: Jun. 11, 2014

(86) PCT No.: PCT/FR2014/051405
§ 371 (c)(1),
(2) Date: Dec. 10, 2015

(87) PCT Pub. No.: WO2014/199075
PCT Pub. Date: Dec. 18, 2014

(65) Prior Publication Data
US 2016/0130188 A1 May 12, 2016

(30) Foreign Application Priority Data
Jun. 13, 2013 (FR) .................................... 13 55485

(51) Int. Cl.
*C04B 41/89* (2006.01)
*C04B 41/50* (2006.01)
(Continued)

(52) U.S. Cl.
CPC ............ *C04B 41/89* (2013.01); *C04B 41/009* (2013.01); *C04B 41/4527* (2013.01);
(Continued)

(58) Field of Classification Search
CPC ... C04B 41/009; C04B 35/565; C04B 35/806; C04B 41/5024; C04B 41/4527;
(Continued)

(56) References Cited

U.S. PATENT DOCUMENTS 5,246,736 A 9/1993 Goujard et al.
5,965,266 A 10/1999 Goujard et al.
(Continued)

FOREIGN PATENT DOCUMENTS

CN 102264670 A 11/2011
WO WO 2010/072978 A1 7/2010

OTHER PUBLICATIONS

International Search Report as issued in International Patent Application No. PCT/FR2014/051405, dated Nov. 24, 2014.
(Continued)

*Primary Examiner* — Jonathan C Langman
(74) *Attorney, Agent, or Firm* — Pillsbury Winthrop Shaw Pittman LLP

(57) ABSTRACT

A part including a substrate in which at least a portion adjacent to a surface of the substrate is made of a refractory material containing silicon, is protected by an environmental barrier formed on the surface of the substrate and having at least a self-healing layer containing a rare earth silicate. The self-healing layer is formed: for at least 90 mol %, by a system constituted by 30 mol % to at most 80 mol % of at least one rare earth silicate $RE_2Si_2O_7$, RE being a rare earth, and at least 20 mol % to 70 mol % of manganese oxide MnO; and for at most 10 mol %, by one or more oxides other than MnO, having a eutectic point with $SiO_2$ less than or
(Continued)

equal to 1595° C.; the self-healing layer presenting a liquid phase having a self-healing function at least throughout the temperature range 1200° C. to 1400° C., while conserving a majority solid phase.

13 Claims, 2 Drawing Sheets

(51) Int. Cl.
  *C04B 41/45* (2006.01)
  *C04B 41/85* (2006.01)
  *C04B 41/00* (2006.01)
  *C04B 41/52* (2006.01)
  *F01D 5/28* (2006.01)

(52) U.S. Cl.
  CPC ...... *C04B 41/5024* (2013.01); *C04B 41/5027* (2013.01); *C04B 41/5028* (2013.01); *C04B 41/52* (2013.01); *C04B 41/85* (2013.01); *F01D 5/288* (2013.01); *C04B 41/4525* (2013.01); *F05D 2300/15* (2013.01); *F05D 2300/211* (2013.01); *Y02T 50/672* (2013.01)

(58) Field of Classification Search
  CPC . C04B 41/5028; C04B 41/52; C04B 41/5096; C04B 41/5037; C04B 41/522; C04B 41/85; C04B 41/89; F01D 5/288; F05D 2300/15; F05D 2300/211; Y02T 50/672
  See application file for complete search history.

(56) References Cited

U.S. PATENT DOCUMENTS

| | | | |
|---|---|---|---|
| 6,068,930 A | 5/2000 | Lamouroux et al. | |
| 6,291,058 B1 | 9/2001 | Goujard et al. | |
| 6,296,941 B1* | 10/2001 | Eaton, Jr. | C04B 41/009 428/446 |
| 6,759,151 B1 | 7/2004 | Lee | |
| 7,666,512 B2* | 2/2010 | Bhatia | C04B 41/009 416/241 B |
| 2009/0004427 A1* | 1/2009 | Sarrafi-Nour | C04B 41/009 428/76 |
| 2011/0256411 A1* | 10/2011 | Courcot | C04B 35/18 428/446 |

OTHER PUBLICATIONS

International Preliminary Report on Patentability and the Written Opinion of the International Searching Authority as issued in International Patent Application No. PCT/FR2014/051405, dated Dec. 15, 2015.
First Office Action as issued in Chinese Patent Application No. 201480032400.9, dated Aug. 22, 2016.

* cited by examiner

Liquid phase at 1300°C

ENVIRONMENTAL BARRIER FOR A REFRACTORY SUBSTRATE CONTAINING SILICON

CROSS-REFERENCE TO RELATED APPLICATIONS

This application is the U.S. National Stage of PCT/FR2014/051405, filed Jun. 11, 2014, which in turn claims priority to French patent application number 1355485 filed Jun. 13, 2013. The content of these applications are incorporated herein by reference in their entireties.

BACKGROUND OF THE INVENTION

The invention relates to providing a part comprising a substrate in which at least a portion adjacent to a surface is made of a refractory material containing silicon, with protection while the part is being used at high temperature in an oxidizing medium, the protection being obtained by forming an environmental barrier on the surface of the substrate.

The invention relates in particular to protecting parts made of refractory composite material such as a ceramic matrix composite (CMC) material containing silicon, in particular a CMC having fiber reinforcement made of ceramic fibers, e.g. silicon carbide (SiC) fibers or fibers based on SiC, and a matrix made at least in part out of SiC.

A particular field of application of the invention is that of protecting CMC parts that form hot portions of gas turbines, such as combustion chamber walls, or turbine rings, or turbine nozzles, or turbine blades, for aeroengines and for industrial turbines.

Document WO 2010/072978 describes forming an environmental barrier having at least one self-healing layer based on a system of oxides formed by at least one rare earth oxide, silica, and alumina. The composition of the self-healing layer is selected so as to conserve a majority solid phase up to at least about 1400° C., while presenting at least one liquid phase at a temperature equal to or higher than about 1400° C., the liquid phase being in sufficient quantity to perform a self-healing function at such a temperature.

Nevertheless, there exists a need to protect CMC parts that are exposed in service to temperatures lying in a range of temperatures below 1400° C. This applies in particular when the fiber reinforcement of the CMC material is made of SiC fibers or of SiC-based fibers having properties that become clearly degraded at 1400° C., but of cost that is significantly less than that of SiC fibers capable of withstanding a temperature of 1400° C. or more without damage.

OBJECT AND SUMMARY OF THE INVENTION

In a first aspect, the invention provides a part comprising a substrate in which at least a portion adjacent to a surface of the substrate is made of a refractory material containing silicon, and an environmental barrier formed on the surface of the substrate and having at least a self-healing layer containing a rare earth silicate, in which part, the self-healing layer is formed:

for at least 90 mole percent (mol %), by a system constituted by 30 mol % to at most 80 mol % of at least one rare earth silicate $RE_2Si_2O_7$, RE being a rare earth, and at least 20 mol % to 70 mol % of manganese oxide MnO; and for at most 10 mol %, by one or more oxides other than MnO, having a eutectic point with $SiO_2$ less than or equal to 1595° C.;

the self-healing layer presenting a liquid phase having a self-healing function at least in the temperature range 1200° C. to 1400° C., while conserving a majority solid phase.

The term "liquid phase having a self-healing function" is used herein to mean the presence of a liquid phase in sufficient quantity to be effective in closing cracks that might appear in the environmental barrier, i.e. representing at least 5 mol % in the composition of the self-healing layer, but without exceeding 40 mol % in said composition, in order to conserve good resistance to being blown off.

The rare earth may be selected from yttrium, scandium, and the lanthanides, for example ytterbium and erbium.

The environmental barrier may also comprise an underlayer interposed between the surface of the substrate and the self-healing layer, and selected from:

an underlayer essentially constituted by at least one rare earth silicate $RE_2Si_2O_7$;

an underlayer essentially constituted by at least one rare earth silicate $RE_2Si_2O_7$ deposited on a silicon coating formed on the substrate;

an underlayer essentially constituted by mullite;

an underlayer essentially constituted by mullite deposited on a silicon coating formed on the substrate; and an underlayer essentially having a silicon-mullite composition gradient starting from silicon beside the substrate and ending with mullite beside the self-healing layer.

In an embodiment, the self-healing layer is interposed between the substrate and an external layer, e.g. made of refractory material or of abradable material.

In a second aspect, the invention provides a method of providing a substrate in which at least a portion adjacent to a surface is made of a refractory material containing silicon, with protection while the substrate is in use at high temperature in an oxidizing medium, by forming an environmental barrier on the surface of the substrate as defined above.

BRIEF DESCRIPTION OF THE DRAWINGS

The invention can be better understood on reading the following description given by way of non-limiting indication. Reference is made to the accompanying drawings, in which.

DETAILED DESCRIPTION OF EMBODIMENTS

In the following detailed description, an environmental barrier is to be formed on a substrate of CMC material containing silicon. It should nevertheless be recalled that the invention is applicable to substrates made of monolithic refractory material containing silicon, and more generally to substrates in which at least a portion adjacent to a surface is made of a refractory material containing silicon (which material may be composite or monolithic).

Figure 1:
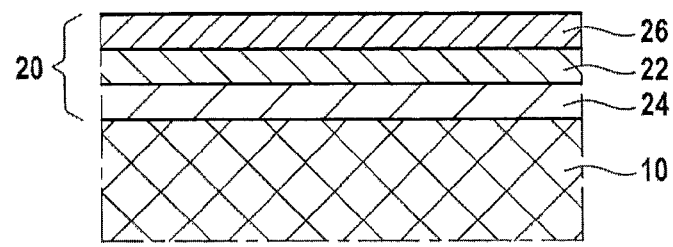
FIG. 1 is a very diagrammatic view of a part made of composite material containing silicon provided with an environmental barrier in an embodiment of the invention.
Figure 2:
FIGS. 2 to 17 are photographs obtained by scanning electron microscope showing the surface states of environmental barriers both in accordance with the invention and not in accordance with the invention.
Figure 3:
Figure 4:
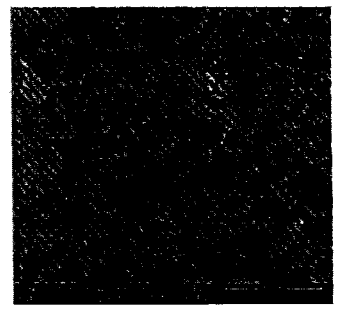
Figure 5:
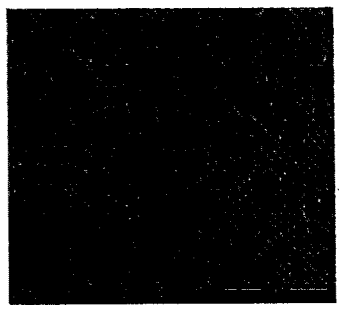
Figure 6:
Figure 7:
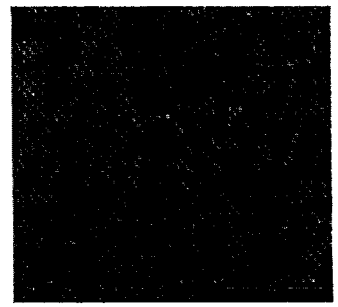
Figure 8:
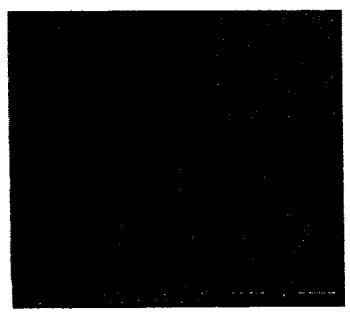

FIG. 1 is a highly diagrammatic view of a substrate 10 having an environmental barrier 20 in an embodiment of the invention.

The substrate 10 is made of CMC material containing silicon and comprises fiber reinforcement that may be made of carbon (C) fibers or of ceramic fibers, for example SiC fibers or fibers made essentially of SiC, including Si—C—O or Si—C—O—N fibers, i.e. also containing oxygen and possibly nitrogen. Such fibers are produced by the Japanese supplier Nippon Carbon under the reference "Nicalon" or "Hi-Nicalon" or "Hi-Nicalon Type-S", or by the Japanese supplier Ube Industries under the reference "Tyranno-ZMI". Ceramic fibers may be coated in a thin interphase layer of pyrolytic carbon (PyC), of boron nitride (BN), or of boron-doped carbon (BC, with 5 atomic percent (at %) to 20 at of B, the balance being C).

The fiber reinforcement is densified by a matrix that is constituted, in full or at least in an outer matrix phase, by a material containing silicon, such as a silicon compound, e.g. SiC, or a ternary Si—B—C system, for example. The term "outer matrix phase" is used to mean a matrix phase formed last, the phase that is furthest from the reinforcing fibers. Under such circumstances, the matrix may be made up of a plurality of layers of different kinds, e.g.:

a mixed C—SiC matrix (the SiC being on the outside);

a sequenced matrix with alternating phases of SiC and matrix phases of lower stiffness, e.g. of pyrolytic carbon (PyC), of boron nitride (BN), or of boron-doped carbon (BC), with a terminal phase of the matrix being made of SiC; or a self-healing matrix with matrix phases made of boron carbide ($B_4C$) or of a Si—B—C ternary system, possibly with free carbon ($B_4$C+C, Si—α-C+C), and with a terminal phase of Si—B—C or of SiC.

Such CMC materials are described in particular in the following documents: U.S. Pat. No. 5,246,736, U.S. Pat. No. 5,965,266, U.S. Pat. No. 6,291,058, and U.S. Pat. No. 6,068,930, with the matrix phases being formed by chemical vapor infiltration (CVI).

The matrix may also be formed at least in part by introducing powders, in particular powders of carbon and possibly also of ceramic, and by infiltration with a metal composition based on silicon in the molten state, so as to form a matrix of SiC—Si type. Such a process is well known and is commonly referred to as melt infiltration (MI).

The environmental barrier 20 is formed over the entire outside surface of the substrate 10 or over a portion only of the surface, e.g. when only a portion of the surface needs to be protected. The environmental barrier 20 comprises a self-healing layer 22. An internal layer or an underlayer 24 may be interposed between the substrate 10 and the self-healing layer 22. The outer layer 26 may be formed on the self-healing layer.

The self-healing layer 22 is essentially, i.e. in this example at a content of at least 90 mol %, in the form of a system constituted by 30 mol % to more than 80 mol % of at least one silicate $RE_2Si_2O_7$, where RE is a rare earth, and at least 20 mol % to 70 mol % of manganese oxide MnO. The rare earth is selected from Y, Sc, and the lanthanides, e.g. Yb and Er. In addition to such a system, the self-healing layer may include in minority manner, i.e. in this example at a content of no more than 10 mol %, one or more oxides other than MnO and having a eutectic point with $SiO_2$ that is less than or equal to 1595° C., e.g. one or more oxides selected from $Al_2O_3$, $Ga_2O_3$, $In_2O_3$, $Nb_2O_5$, ZnO, and $Ta_2O_5$. Adding these other oxides serves in particular to modulate the self-healing temperature or the coefficient of thermal expansion.

Nevertheless, ignoring inevitable impurities, the self-healing layer 22 is preferably constituted by an $RE_2Si_2O_7$—MnO system.

As can be seen from the examples given below, the composition of the layer 22 with significant presence of MnO makes it possible to form a liquid phase having a self-healing function throughout the temperature range going from at most 1200° C. to at least 1400° C., while conserving a majority solid phase. This does not exclude the presence of a liquid phase having a self-healing function at a temperature lower than 1200° C., e.g. as from 1150° C., and at a temperature higher than 1400° C.

The optional underlayer 24 may be formed essentially by at least one rare earth silicate $RE_2Si_2O_7$ and may be deposited on a silicon coating formed on the substrate, the rare earth being selected for example from Y, Sc, and the lanthanides, such as for example Yb, Dy, Er, and La. The rare earth of the underlayer 24 may be identical to that of the self-healing layer 22 or it may be different therefrom.

The underlayer 24 may also be formed essentially of mullite deposited on the substrate 10 directly or with an interposed coating of silicon formed on the substrate in order to enhance adhesion of the mullite. It is also possible to form the underlayer by a coating having essentially a silicon-mullite composition gradient starting with silicon beside the substrate and terminating with mullite beside the self-healing layer 22.

The underlayer 24 may include other ingredients in minority manner, e.g. one or more oxides serving to modulate the coefficient of thermal expansion. These other ingredients represent at most 30 mol %, and preferably at most 10% of the composition of the underlayer 24. It is important for the underlayer 24 to remain chemically and thermally stable in the conditions of use and for it to be chemically and thermo-mechanically compatible with the substrate and with silica. In other words, it is desirable for the underlayer 24 to remain in the solid state at the looked-for self-healing temperatures of the self-healing layer 22 and to avoid any direct contact between the substrate 10 and the self-healing layer 22, and for it to avoid forming any liquid phase with the substrate and the silica contained in the self-healing layer 22, or coming from oxidation of the silicon of the substrate 10. It is also desirable for the coefficient of thermal expansion of the underlayer 24 to be relatively close to that of the substrate 10 and of the self-healing layer 22.

The underlayer 24 may optionally comprise the same rare earth silicate $RE_2Si_2O_7$ as that included in the composition of the self-healing layer.

The optional outer layer 26 may be made of a refractory material, e.g. for parts of CMC requiring surface treatment such as turbine blades that need to present a smooth surface state. The outer layer may then be formed by mullite, a silicate, e.g. aluminum silicate, or indeed a refractory oxide. The smooth surface state may be obtained by machining or by polishing. In a variant, in such applications, the self-healing layer 22 may constitute the outer layer of the environmental barrier, with any surface machining or polishing then being performed on the self-healing layer 22.

The optional outer layer 26 may also be made of abradable material, e.g. for CMC parts forming turbine rings. Such an abradable material may be constituted by a porous ceramic, in well-known manner, so as to enable wipers at the tips of moving blades to penetrate without damage into the abradable material and thereby reduce the clearance between the blade tips and the turbine rings.

The underlayer 24 may be formed on the substrate 10 by plasma spraying using solid powders of $RE_2O_3$ and $SiO_2$ and/or powders of the $RE_2Si_2O_7$ compound, and possibly powders of other minority ingredients.

In similar manner, the self-healing layer 22 may be formed on the underlayer 24 by plasma spraying from solid powders of $RE_2O_3$, $SiO_2$, or $RE_2Si_2O_7$, together with MnO and possibly powders of other minority oxides as mentioned above, the respective quantities of the sprayed powders being selected as a function of the desired final composition.

The outer layer 26 may also be formed on the substrate 10 by plasma spraying from ceramic powder(s).

Other methods can be envisaged for forming the underlayer 24, the self-healing layer 22, and the outer layer 26, e.g. delivering particles in sol-gel form, applying powders in the form of a slip, deposition by electrophoresis, physical vapor deposition (PVD), or indeed chemical vapor deposition (CVD). It is also possible to make use of flash sintering of previously deposited powders or of spark plasma sintering (SPS) processes.

The thickness of any underlayer 24 is selected to be relatively thin, e.g. lying in the range 10 micrometers (µm) to 300 µm. The thickness of the self-healing layer 22 may also be selected to be relatively thin, e.g. lying in the range 10 µm to 300 µm. The thickness of any outer layer 26 should be selected as a function of requirements and may lie in the range 500 µm to 1500 µm. The thicknesses of the layers may also depend on the capacity of the deposition process that is used for forming homogeneous thin layers of substantially uniform thickness. Thus, by way of example, for small thicknesses, it may be preferred to use a PVD or CVD type deposition process.

The presence of a self-healing layer makes it possible to have an environmental barrier that is effective, leakproof, and long-lasting at the self-healing temperatures. In the event of returning to a temperature below the self-healing temperature, the liquid phase crystallizes and leakproofing continues to be ensured by means of a coating that is in the form of juxtaposed grains. In the event of cracks appearing, raising the temperature up to the self-healing temperature suffices to close the cracks.

Example 1

In order to evaluate the self-healing potential of various compositions at different temperatures, pellets were prepared, each formed an underlayer of yttrium silicate $Y_2Si_2O_7$ covered in a layer formed from a mixture of $Y_2Si_2O_7$ and of MnO powders. The two layers were made by flash sintering the powders and they presented a thickness of about 1 millimeter (mm). The pellets were then heat treated for 50 hours in air and then air quenched prior to being observed with a scanning electron microscope (SEM).

For a heat treatment temperature of 1200° C., it was observed that a liquid phase was formed in desired quantity for providing a self-healing function providing the molar percentage of MnO in the $Y_2Si_2O_7$—MnO mixture was at least 20%, this percentage preferably lying in the range 20 mol % to 70 mol %, so as to obtain, starting from 1200° C. and up to 1400° C., a coating of liquid phase while being stable on the surface, i.e. with the presence of sufficient solid phase to provide good resistance to being blown off.

A liquid phase appears starting from 1150° C. for a molar content of MnO lying in the range 30% to 50% in the $Y_2Si_2O_7$—MnO system.

FIGS. 2 to 17 are SEM photographs for various compositions of the $Y_2Si_2O_7$—MnO mixture and various heat treatment temperatures as listed in the table below, which mentions whether or not a liquid phase was present suitable for performing the self-healing function (S—H phase):

| FIG. | % mol MnO in $Y_2Si_2O_7$—MnO | Temperature (° C.) | S-H phase |
|---|---|---|---|
| 2 | 10 | 1200 | no |
| 3 | 10 | 1300 | no |
| 4 | 10 | 1400 | yes |
| 5 | 20 | 1200 | yes |
| 6 | 20 | 1300 | yes |
| 7 | 20 | 1400 | yes |
| 8 | 40 | 1200 | yes |
| 9 | 40 | 1300 | yes |
| 10 | 40 | 1400 | yes |
| 11 | 64 | 1200 | yes |
| 12 | 64 | 1300 | yes |
| 13 | 64 | 1400 | yes |
| 14 | 85 | 1200 | yes |
| 15 | 85 | 1300 | excessive liquid phase |
| 16 | 30 | 1150 | yes |
| 17 | 40 | 1150 | yes |

Figure 9:
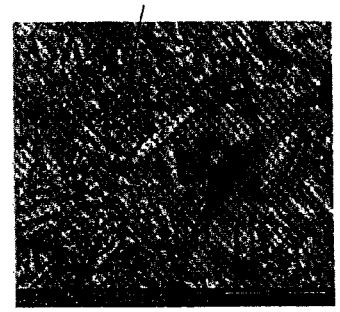
Figure 10:
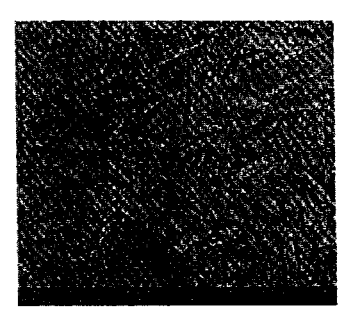
Figure 11:
Figure 12:
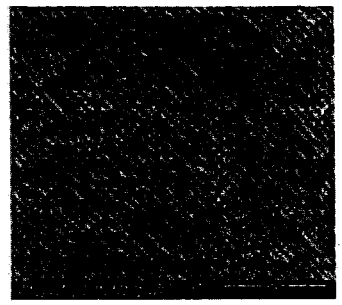
Figure 13:
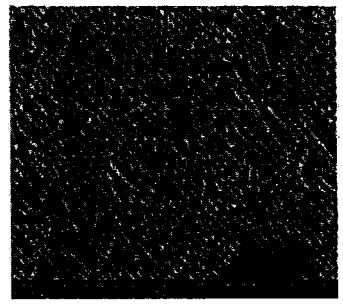
Figure 14:
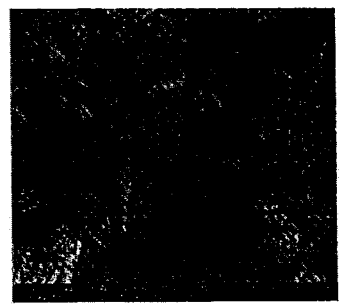
Figure 15:
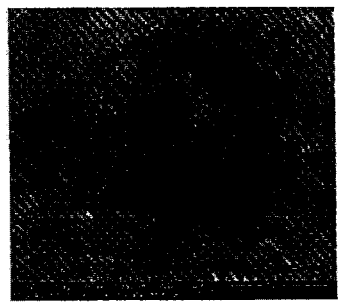
Figure 16:
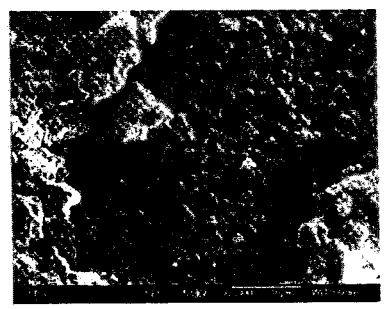
Figure 17:
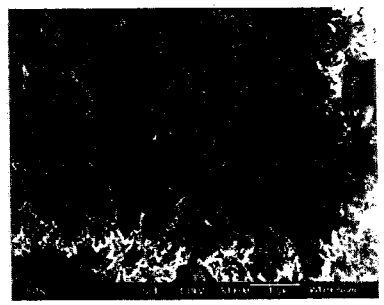

In FIGS. 5 to 17, the presence of a liquid phase at the grain boundaries can be seen, as shown in FIG. 9 by way of example. In FIG. 15, this liquid phase is excessive, i.e. it is likely to cause the material to dissolve in the liquid phase and consequently to lead to material being eliminated by being blown off.

Example 2

The procedure was the same as in Example 1 except that MnO was replaced by gallium oxide $Ga_2O_3$ with molar contents of $Ga_2O_3$ in the $Y_2Si_2O_7$—$Ga_2O_3$ mixture equal to 5%, 10%, 25%, and 53% and with heat treatment temperatures of 1300° C., 1350° C., and 1400° C. The presence of a liquid phase capable of performing the self-healing function was not observed.

Example 3

The procedure was the same as in Example 1 except that MnO was replaced by niobium oxide $Nb_2O_5$ with molar contents of $Nb_2O_5$ in the $Y_2Si_2O_7$—$Nb_2O_5$ mixture equal to 5%, 10%, 25%, and 48%, 60%, and 85% and with heat treatment temperatures of 1300° C., 1350° C., and 1400° C. The presence of a liquid phase capable of performing the self-healing function was not observed.

Example 4

The procedure was the same as in Example 1 except that MnO was replaced by zinc oxide ZnO with molar contents of ZnO in the $Y_2Si_2O_7$—ZnO mixture equal to 5%, 10%, 15%, 50%, 60%, and 85% and with heat treatment temperatures of 1200° C., 1300° C., 1350° C., and 1400° C. The presence of a liquid phase capable of performing the self-healing function was not observed.

Examples 2 to 4 show that substituting MnO with the oxides $Ga_2O_3$, $Nb_2O_5$, or ZnO that also have the ability to lower melting points when mixed with $Y_2Si_2O_7$ is ineffective in obtaining a self-healing layer of the kind described.

The invention claimed is:

1. A part comprising a substrate in which at least a portion adjacent to a surface of the substrate is made of a refractory material containing silicon, and an environmental barrier formed on the surface of the substrate and having at least a self-healing layer containing a rare earth silicate, wherein the self-healing layer is formed:
- for at least 90 mol %, by a system constituted by 30 mol % to at most 80 mol % of at least one rare earth silicate $RE_2Si_2O_7$, RE being a rare earth, and at least 20 mol % to 70 mol % of manganese oxide MnO; and
- for at most 10 mol %, by one or more oxides other than MnO, having a eutectic point with $SiO_2$ less than or equal to 1595° C., said one or more oxides, when present, being selected from $Ga_2O_3$, $In_2O_3$, $Nb_2O_5$, ZnO and $Ta_2O_5$;
- the self-healing layer presenting a liquid phase having a self-healing function at least throughout the temperature range 1200° C. to 1400° C., while conserving a majority solid phase.

2. A part according to claim 1, wherein RE is selected from yttrium, scandium, and the lanthanides.

3. A part according to claim 1, wherein the environmental barrier further comprises an underlayer interposed between the surface of the substrate and the self-healing layer, and selected from:
- an underlayer essentially constituted by at least one rare earth silicate $RE_2Si_2O_7$;
- an underlayer constituted by at least one rare earth silicate $RE_2Si_2O_7$ deposited on a silicon coating formed on the substrate;
- an underlayer essentially constituted by mullite;
- an underlayer essentially constituted by mullite deposited on a silicon coating formed on the substrate; and
- an underlayer essentially having a silicon-mullite composition gradient starting from silicon beside the substrate and ending with mullite beside the self-healing layer.

4. A part according to claim 1, wherein the self-healing layer is interposed between the substrate and an external layer of refractory material.

5. A part according to claim 1, wherein the self-healing layer is interposed between the substrate and an external layer of abradable material.

6. A part according to claim 1, wherein RE is yttrium.

7. A part according to claim 1, wherein the substrate is made of a ceramic matrix composite material having fiber reinforcement.

8. A part according to claim 7, wherein the matrix is made up of a plurality of different layers.

9. A method of providing a substrate in which at least a portion adjacent to a surface is made of a refractory material containing silicon, with protection while the substrate is in use at high temperature in an oxidizing medium, by forming an environmental barrier on the surface of the substrate, the barrier having at least a self-healing layer containing a rare earth silicate, wherein the self-healing layer is formed:
- for at least 90 mol %, by a system constituted by 30 mol % to at most 80 mol % of at least one rare earth silicate $RE_2Si_2O_7$, RE being a rare earth, and at least 20 mol % to 70 mol % of manganese oxide MnO; and
- for at most 10 mol %, by one or more oxides other than MnO, having a eutectic point with $SiO_2$ less than or equal to 1595° C., said one or more oxides, when present, being selected from $Ga_2O_3$, $In_2O_3$, $Nb_2O_5$, ZnO and $Ta_2O_5$;
- so as to obtain a self-healing layer presenting a liquid phase having a self-healing function at least throughout the temperature range 1200° C. to 1400° C., while conserving a majority solid phase.

10. A method according to claim 9, wherein RE is selected from yttrium, scandium, and the lanthanides.

11. A method according to claim 9, wherein an environmental barrier is formed also having a sublayer interposed between the surface of the substrate and the self-healing layer, the sublayer being selected from:
- an underlayer essentially constituted by at least one rare earth silicate $RE_2Si_2O_7$;
- an underlayer constituted by at least one rare earth silicate $RE_2Si_2O_7$ deposited on a silicon coating formed on the substrate;
- an underlayer essentially constituted by mullite;
- an underlayer essentially constituted by mullite deposited on a silicon coating formed on the substrate; and
- an underlayer essentially having a silicon-mullite composition gradient starting from silicon beside the substrate and ending with mullite beside the self-healing layer.

12. A method according to claim 9, wherein an external layer of refractory material is formed on the self-healing layer.

13. A method according to claim 9, wherein an external layer of abradable material is formed on the self-healing layer.

* * * * *